United States Patent
Zhou et al.

(10) Patent No.: US 12,465,903 B2
(45) Date of Patent: Nov. 11, 2025

(54) PRODUCTION SYSTEM AND METHOD FOR INSOLUBLE SULFUR

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Yong Zhou, Liaoning (CN); Changjian Liao, Liaoning (CN); Fanfei Meng, Liaoning (CN); Zhiyu Liu, Liaoning (CN); Haibo Wang, Liaoning (CN); Ping Jin, Liaoning (CN); Jinling Dai, Liaoning (CN); Ping Liu, Liaoning (CN); Yong Piao, Liaoning (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

( * ) Notice: Subject to any disclaimer, the term of this patent is extended or adjusted under 35 U.S.C. 154(b) by 735 days.

(21) Appl. No.: 17/758,287

(22) PCT Filed: Dec. 28, 2020

(86) PCT No.: PCT/CN2020/140097
§ 371 (c)(1),
(2) Date: Jun. 30, 2022

(87) PCT Pub. No.: WO2021/136160
PCT Pub. Date: Jul. 8, 2021

(65) Prior Publication Data
US 2023/0035805 A1 Feb. 2, 2023

(30) Foreign Application Priority Data
Dec. 31, 2019 (CN) .......................... 201911418296.8

(51) Int. Cl.
*C01B 17/12* (2006.01)
*B01J 19/06* (2006.01)
(Continued)

(52) U.S. Cl.
CPC ........... *B01J 19/06* (2013.01); *B01J 19/2415* (2013.01); *C01B 17/0232* (2013.01); *C01B 17/0237* (2013.01); *C01B 17/12* (2013.01)

(58) Field of Classification Search
None
See application file for complete search history.

(56) References Cited

U.S. PATENT DOCUMENTS

| | | | |
|---|---|---|---|
| 2005/0143507 A1 | 6/2005 | Hagemann et al. | |
| 2013/0052122 A1 | 2/2013 | Chen et al. | |

FOREIGN PATENT DOCUMENTS

| | | |
|---|---|---|
| CN | 1552619 A | 12/2004 |
| CN | 2672030 Y | 1/2005 |

(Continued)

OTHER PUBLICATIONS

Jiang, Biqing; "Production technology of insoluble sulfur by low temperature melting"; Journal of Chemical Industry and Engineering; Apr. 2006; vol. 27, No. 2; p. 57-60.

*Primary Examiner* — Sheng H Davis
(74) *Attorney, Agent, or Firm* — NKL Law; Allen Xue (57) ABSTRACT

A production system for insoluble sulfur includes a polymeric kettle having a first discharge port and a quench tower (200) having a feed port. The first discharge port is in communication with the feed port. The quench tower has a cylindrical housing, a granulation device and a shear pump. A solvent inlet and a quenching agent inlet, which are (Continued)

respectively used for providing a solvent and a quenching agent, are arranged on the side wall of the housing. The sulfur production method includes raising the temperature of liquid sulfur under the protection of an initiator and nitrogen to perform polymerization reaction; introducing the polymerized material into the quenching tower and sequentially carrying out granulation and quenching treatment; carrying out solvent curing and extraction integrated treatment on the quenched product; and carrying out liquid phase circulating crushing and extraction integrated treatment on the cured and extracted product.

14 Claims, 4 Drawing Sheets

(51) Int. Cl.
    *B01J 19/24*    (2006.01)
    *C01B 17/02*    (2006.01)

(56) References Cited

FOREIGN PATENT DOCUMENTS

| | | | |
|---|---|---|---|
| CN | 1986388 | A | 6/2007 |
| CN | 101066753 | A | 11/2007 |
| CN | 102070127 | * | 5/2011 |
| CN | 102070127 | A | 5/2011 |
| CN | 102976281 | A | 3/2013 |
| CN | 204295905 | U | 4/2015 |
| CN | 104843651 | A | 8/2015 |
| CN | 105502303 | A | 4/2016 |
| CN | 105694096 | A | 6/2016 |
| CN | 206172977 | U | 5/2017 |
| CN | 106892410 | A | 6/2017 |
| CN | 106946230 | * | 7/2017 |
| CN | 106946230 | A | 7/2017 |
| CN | 107337184 | * | 11/2017 |
| CN | 107337184 | A | 11/2017 |
| CN | 206799166 | U | 12/2017 |
| CN | 207435026 | U | 6/2018 |
| CN | 207628144 | * | 7/2018 |
| CN | 108383088 | A | 8/2018 |
| CN | 208071319 | U | 11/2018 |
| CN | 109336061 | A | 2/2019 |
| CN | 209204988 | * | 8/2019 |
| CN | 209555166 | * | 10/2019 |
| CN | 209555167 | * | 10/2019 |
| RU | 2107657 | C1 | 3/1998 |
| RU | 2177825 | C1 | 1/2002 |
| RU | 2645134 | C1 | 2/2018 |

* cited by examiner

PRODUCTION SYSTEM AND METHOD FOR INSOLUBLE SULFUR

CROSS REFERENCE TO RELATED APPLICATION

This application is a U.S. national stage entry of PCT International Application No. PCT/CN2020/140097, filed on Dec. 28, 2020, which claims the benefit of priority from Chinese Patent Application No. 201911418296.8, the content of which is incorporated herein by reference in its entirety.

FIELD

The present invention belongs to the technical field of petrochemical industry, and relates to a production system and method for insoluble sulfur.

BACKGROUND

With the rapid increase of oil consumption, the global oil resources are scarcer increasingly, and the raw materials in refineries are heavier and poorer increasingly; at the same time, the environmental protection laws and regulations in different countries become stricter increasingly, and the control on the total sulfur content in petroleum products and natural gas become stricter increasingly. Therefore, the capacities of sulfur recovery units in major refineries and natural gas purification plants are increased rapidly. The domestic and international markets of common sulfur have become saturated, and the price of common sulfur is lower increasingly. How to provide high value-added sulfur products that are in short supply in the markets has become a focus of interest of relevant enterprises. Insoluble sulfur is a high-efficiency rubber vulcanizing agent, which has the advantages of high distribution stability in rubber compounds, uniform vulcanization cross-linking points of vulcanization in products, etc., and can avoid frosting on the surfaces of rubber compounds and improve the adhesion between rubber and steel wires or chemical fiber cords.

The patent application No. CN102070127A has disclosed an insoluble sulfur production method, which comprises the following steps: (1) melt polymerization; (2) atomization and cold extraction; (3) curing; (4) centrifugal separation; (5) continuous drying; (6) crushing, screening and oil filling, so as to obtain a finished product finally; although the method is a continuous production method, the required sulfur polymerization temperature and pressure are high with the method, specifically, the operating temperature is 580-690° C., and the operating pressure is 0.8-1.2 MPa; therefore, the requirements for the reaction apparatus are high.

The patent application No. CN107337184A has disclosed heat-resistant and stable insoluble sulfur and a production method thereof. The production method comprises: (1) pre-melting: loading industrial raw sulfur into a sulfur melting pool at 130-150° C. and pre-melting, till the raw sulfur is turned into liquid sulfur; (2) reaction: introducing the liquid sulfur into a reaction kettle, adjusting the temperature to 240° C., adding 0.6% KI, and keeping the reaction for certain time under the conditions of $N_2$ shielding and mechanical stirring; (3) quenching: loading the product obtained in the step (2) in a gasification chamber containing $N_2$ for gasification to form superheated vapor, and spraying the superheated vapor into quenching water for quenching; (4) extraction: extracting the sulfur in the quenching water with an organic solvent; (5) crushing: loading the extracted sulfur into a dryer at 45-50° C. and carrying out drying till the moisture content in the sulfur is reduced to 2%-4% of the moisture content before drying, then crushing the sulfur in a tube mill, and screening the crushed suffer through a 300-400 mpi sieve, so as to obtain heat-resistant and stable insoluble sulfur.

The properties of the insoluble sulfur obtained through extruding and quenching, gas drying and curing, and mechanical crushing procedures, etc. with the existing low-temperature melting method are unsatisfactory. During the discharging and quenching of the polymerized sulfur, the polymerized sulfur is usually discharged by extrusion into a quenching tower for quenching. Thus, the quenched material is in the form of lumps, which are not easy to transport because they may cause clogging in the pipeline and equipment. Therefore, the lumps can only be transported intermittently among different devices or apparatuses, resulting in a complex system operation process.

SUMMARY

To solve the problems of a complex intermittent operation process and poor product properties in the production of insoluble sulfur through a low-temperature melting process in the prior art, the present invention aims at providing an insoluble sulfur production system and a method thereof, which solve the problems of difficult solid material transportation and poor product properties, and can be used to obtain insoluble sulfur with high product purity, high thermal stability, and high yield. In an aspect, the present invention provides an insoluble sulfur production system, which comprises a polymeric kettle having a first discharge port and a quenching tower having a feed port, wherein the first discharge port is in communication with the feed port, and the quenching tower comprises a cylindrical housing, a granulation device and a shear pump, the housing comprises a feed quenching section and a discharging section that are arranged from top to bottom, and the side wall of the housing is provided with a solvent inlet for providing a solvent and a quenching agent inlet for providing a quenchant, wherein:

the feed port is arranged on the feed quenching section, and the granulation device is arranged near the feed port and positioned in the feed quenching section;

the discharging section is provided with a second discharge port and a filter screen above the second discharge port, and the side wall of the discharging section is provided with a circulating outlet and a circulating inlet in communication with an inlet an outlet of the shear pump and circulating pump respectively above the filter screen.

In another aspect, the present invention provides an insoluble sulfur production method, which comprises:
  S1. raising the temperature of liquid sulfur in the present of an initiator and under nitrogen shielding to perform polymerization reaction;
  S2. introducing the polymerized material into a quenching tower and carrying out granulation and quenching treatment sequentially;
  S3. carrying out solvent curing and extraction integrated treatment on the quenched product in the quenching tower;
  S4. carrying out liquid-phase circulated crushing and extraction integrated treatment on the cured and extracted product in the quenching tower.

With the above technical scheme, the insoluble sulfur production system provided by the present invention can accomplish granulation, quenching, curing extraction, and crushing extraction in the quenching tower and output a slurry material. By granulation in the granulation device after the feeding, it can ensure that the material is in a granular state in the follow-up quenching, curing and extraction process, so that the material contacts with the solvent and the quenchant extensively and can form a circulating flow along with the liquid; the shear pump and the filter screen ensure that the slurry material can be outputted from the second discharge port, thus avoiding clogging in the transportation pipeline during subsequent transportation; the granulation device, circulating pump, shear pump, inner circulating cylinder and liquid distributor etc. can realize uniform distribution of the temperature field during material quenching, as well as integrated operation of curing extraction and crushing extraction.

100—polymeric kettle; 200—quenching tower; 210—housing; 211—feed quenching section; 212—material circulation section; 213—discharging section; 214—solvent inlet; 215—quenching agent inlet; 216—material separation section; 217—circulating liquid outlet; 218—material flow guide plate; 220—granulation device; 221—first feed pipe; 222—first distribution pipe; 2221—first fixed pipe; 2222—first rotary pipe; 2223—first discharge channel; 2224—first discharge hole; 230—shear pump; 240—inner circulating cylinder; 241—circulating flow guide plate; 250—liquid distributor; 260—filter screen; 270—quenchant distributor; 271—second feed pipe; 272—second distribution pipe; 2721—second fixed pipe; 2722—second rotary pipe; 2723—second discharge channel; 2724—second discharge hole; 280—circulating pump; 300—cooler; 500—filter; 600—dryer; 700—discharge pump.

DETAILED DESCRIPTION

Hereunder some embodiments of the present invention will be detailed with reference to the accompanying drawings. It should be understood that the embodiments described herein are only provided to describe and explain the present invention rather than constitute any limitation to the present invention.

In the present disclosure, unless otherwise specified, the terms that denote the orientations are used as follows, for example: "top", "bottom", "left" and "right" usually refer to "top", "bottom", "left" and "right" as shown in the accompanying drawings; "inside" and "outside" refer to inside and outside in relation to the profiles of the components. Hereunder the present invention will be detailed in embodiments with reference to the accompanying drawings.

In an aspect, the present invention provides an insoluble sulfur production system, which comprises a polymeric kettle 100 having a first discharge port and a quenching tower 200 having a feed port, wherein the first discharge port is in communication with the feed port, and the quenching tower 200 comprises a cylindrical housing 210, a granulation device 220 and a shear pump 230, the housing 210 comprises a feed quenching section 211 and a discharging section 213 that are arranged from top to bottom, and the side wall of the housing 210 is provided with a solvent inlet 214 for providing a solvent and a quenching agent inlet 215 for providing a quenchant respectively, wherein:

the feed port is arranged on the feed quenching section 211, and the granulation device 220 is arranged near the feed port and positioned in the feed quenching section 211;

the discharging section 213 is provided with a second discharge port and a filter screen 260 above the second discharge port, and the side wall of the discharging section 213 is provided with a circulating outlet and a circulating inlet in communication with the inlet and outlet of the shear pump 230 respectively above the filter screen 260.

The insoluble sulfur production system provided by the present invention can accomplish granulation, quenching, curing extraction, and crushing extraction in the quenching tower and output a slurry material. By granulation in the granulation device 220 after the feeding, it can ensure that the material is in a granular state in the follow-up quenching, curing and extraction process, so that the material contacts with the solvent and the quenchant extensively and can form a circulating flow along with the liquid; the shear pump 230 and the filter screen 260 ensure that the slurry material can be outputted from the second discharge port, thus avoiding clogging in the inner circulating cylinder and the transportation pipeline during subsequent transportation.

Figure 1:
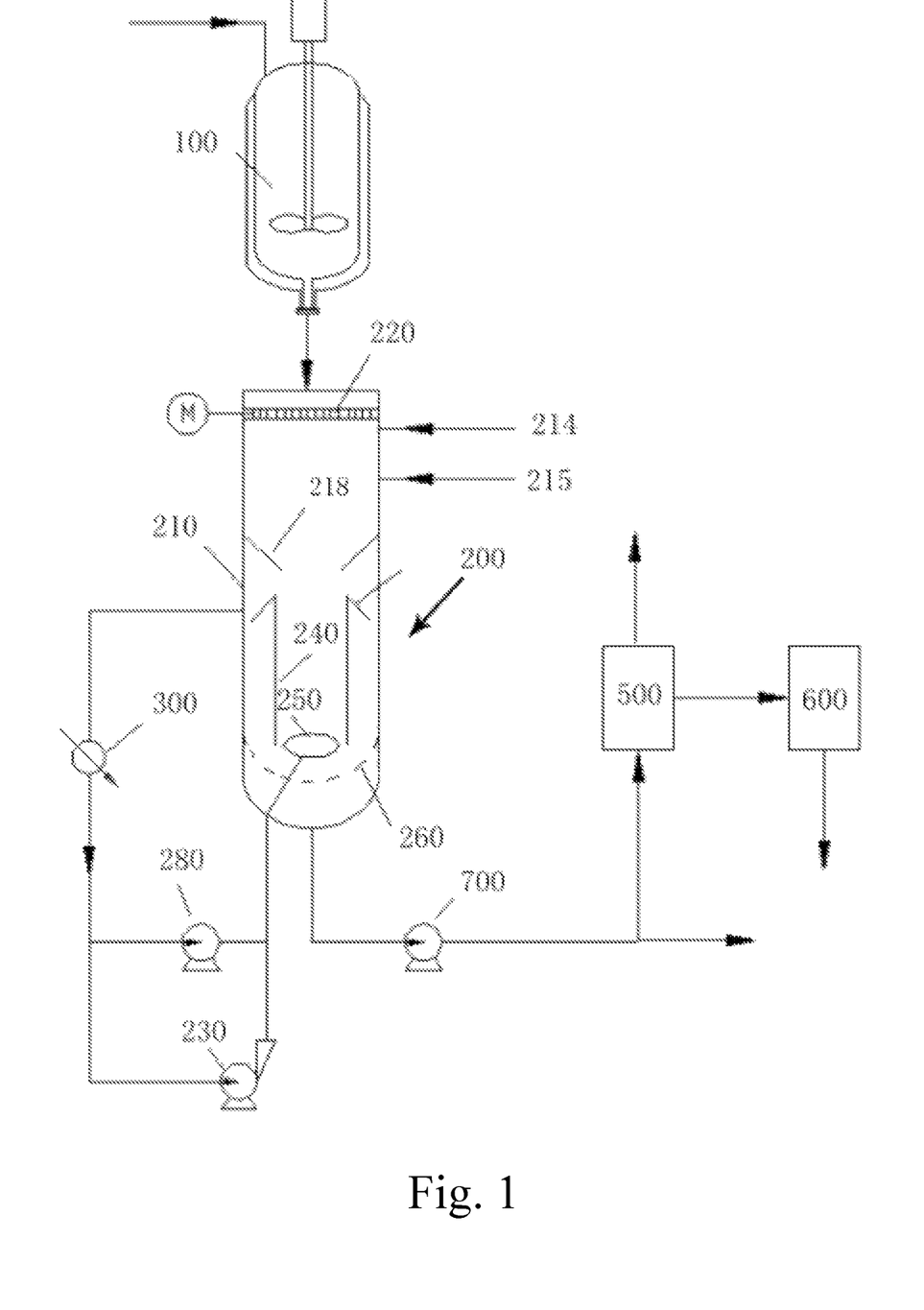
FIG. 1 is a schematic structural diagram of an embodiment of the insoluble sulfur production system according to the present invention.
Figure 2:
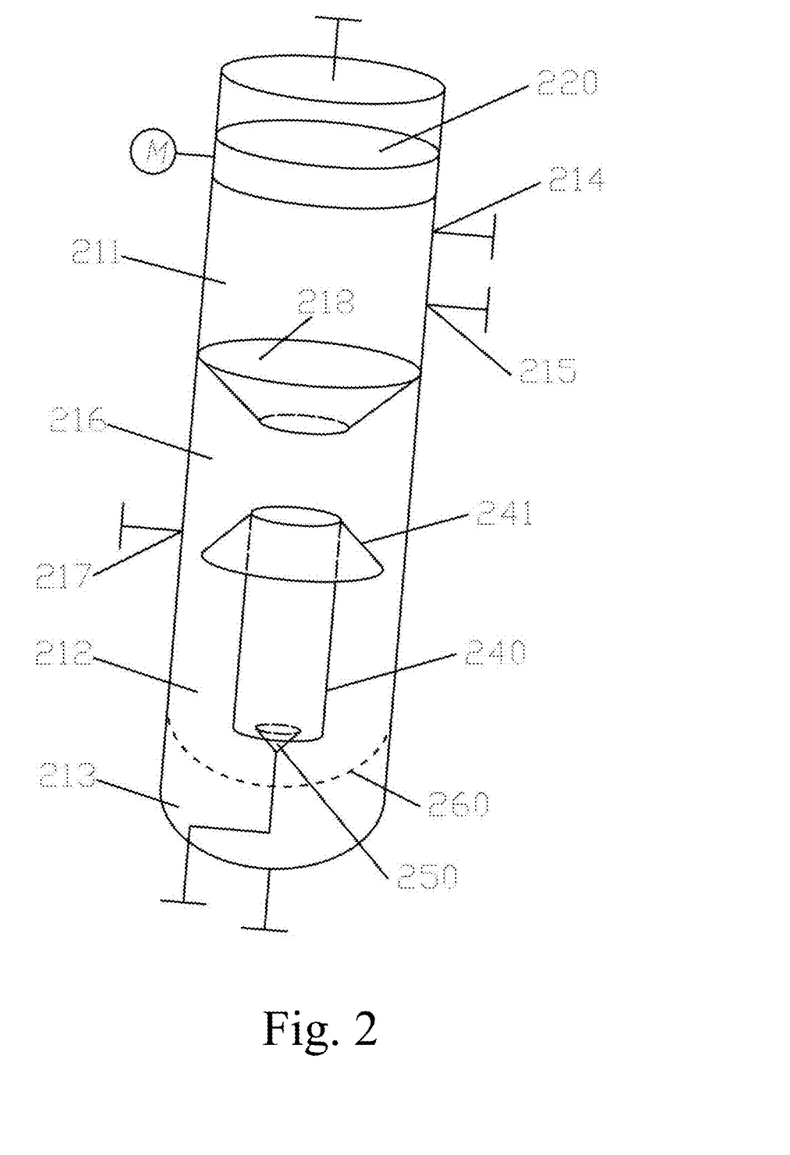
FIG. 2 is a schematic structural diagram of the quenching tower in FIG. 1.

Specifically, as shown in FIGS. 1 and 2:

Liquid sulfur is preheated to 110-120° C. and fed into the polymeric kettle 100; at the same time, an initiator is added into the polymeric kettle 100 in an amount equal to 0.05%-0.3% of the amount of the liquid sulfur. The material is heated to 200-270° C. under nitrogen shielding for polymerization reaction, and is kept at the temperature for 30-60 minutes.

After the polymerization, the liquid sulfur is fed into the quenching tower 200 through the feed port; the material is granulated in the granulation device 200 first, and then the granular material (i.e., the hot sulfur granules that are formed from liquid drops and have a solid outer layer and a liquid inner core as described below) contacts with the quenchant in the quenching tower 200 (the quenchant is introduced into the quenching tower 200 through a quenching agent inlet 215, and soft water may be used as the quenchant); the hot sulfur granules are quenched and solidified in the feed quenching section 211 and for example, immersed in the quenchant in the inner circulating cylinder 240; the quenching temperature is 50-70° C.; after quenching for 5-30 minutes, the quenchant is discharged from the quenching tower 200 through the second discharge port, and the solid granules formed after quenching are retained in the quenching tower 240 by the filter screen 260.

Then, a solvent is fed into the quenching tower 200 continuously through the quenching agent inlet 215 so as to extract the soluble sulfur continuously; after curing at 55-75° C. temperature for 3-10 hours, the shear pump 230 is started to shear the sulfur granules cyclically at 45-75° C. for 30-60 minutes; when the sulfur granules are in size smaller than 0.15 mm, the fine sulfur granules are discharged from the second discharge port through the filter screen 260.

As described above, in the insoluble sulfur production system provided by the present invention, quenching, curing extraction and crushing extraction can be completed without transporting the materials, and finally a slurry material containing fine granules is discharged from the second discharge port, thus the possibility of clogging in the output pipeline is greatly decreased. In addition, by means of continuous quenching, curing extraction and crushing extraction in the quenching tower 200, the processing time can be greatly shortened, the processing equipment and process can be simplified, and the production efficiency can be improved.

In the present invention, during quenching, curing extraction and crushing extraction, the quenchant and solvent can be continuously inputted, while the second discharge port is kept open, so as to maintain the required processing temperature.

Alternatively, in order to reduce the cost and improve the efficiency, the quenchant and solvent may be recycled and reused. Preferably, the insoluble sulfur production system may comprise a cooler 300, and the housing 210 comprises a material separation section 216 for solid-liquid separation and a material circulation section 212 for circulating the materials between the feed quenching section 211 and the discharging section 213, an inner circulating cylinder 240 and a liquid distributor 250 for spraying a quenchant or solvent into the inner circulating cylinder 240 are arranged in the material circulating section 212, and a circulating liquid outlet 217 for discharging the separated liquid is arranged in the side wall of the material separating section 216, the liquid discharged from the circulating liquid outlet 217 is cooled by the cooler 300 and sent by the circulating pump 280 to the circulating inlet, which is in communication with the liquid distributor 250.

During the quenching, the quenchant in the quenching tower 200 flows through the cooler 300 from the circulating liquid outlet 217 for cooling, is pressurized by the circulating pump 280 and circulated into the circulating inlet and sprayed by the liquid distributor 250 into the inner circulating cylinder 240, thereby the quenchant is recycled and reused. Likewise, during curing extraction, the solvent flows through the cooler 300 from the circulating liquid outlet 217 for cooling, is pressurized by the circulating pump 280 and circulated into the circulating inlet and sprayed by the liquid distributor 250 into the inner circulating cylinder 240, thereby the solvent is recycled and reused; during crushing extraction, the solvent flows through the cooler 300 from the circulating liquid outlet 217 for cooling, is sheared by the shear pump 230 and circulated into the circulating inlet and sprayed by the liquid distributor 250 into the inner circulating cylinder 240, thereby the solvent is recycled and reused. Under the action of cyclic transportation by the circulating pump 280 or shear pump 230, the granular material in the inner circulating cylinder 240 collides and contacts with the quenchant or solvent extensively and is formed in a fluidized state, thereby the quenching, curing and extraction can be carried out better and more quickly.

The material separation section 216 is used to separate the granular material carried in the fluid from the liquid (e.g., the quenchant or solvent), so that the liquid discharged from the circulating liquid outlet 217 can be circulated. When the fluid gushes from the upper end of the inner circulating cylinder 240 via the circulating pump 280, the flow rate of the fluid is decreased owing to the that the flow section is changed from the cross section of the inner circulating cylinder 240 to the cross section of the housing 210 suddenly, thus the granular material settles down under gravity action and is separated from the liquid, and the separated granular material is retained in the inner circulating cylinder 240 or falls down along the outer wall of the inner circulating cylinder 240. To guide the falling of the granular material, a conical cylinder-shaped circulating flow guide plate 241 expanding downward gradually is arranged on the periphery at the top of the inner circulating cylinder 240, and clearance exists between the circulating flow guide plate 241 and the inner wall of the housing 210. Preferably, the radius of the lower end of the circulating flow guide plate 241 is 0.5-0.9 times of the radius of the housing 210, so as to maintain appropriate clearance. The lower end of the circulating flow guide plate 241 is located below the circulating liquid outlet 217, so as to prevent the granular material from entering the circulating liquid outlet 217 when the quenchant or solvent is circulated.

In addition, preferably, a conical cylinder-shaped material flow guide plate 218 tapered toward the inner circulating cylinder 240 may be arranged on the inner wall of the material separation section 216. Thus, the granular material formed through granulation can be guided by the material flow guide plate 218 into the inner circulating cylinder 240. To avoid interference with solid-liquid separation, the material flow guide plate 218 is located above the circulating liquid outlet 217.

Preferably, in order to guide the material into the inner circulating cylinder 240 at an appropriate speed under the guidance of the material flow guide plate 218, the material flow guide plate 218 is arranged in at least one of the following forms:

The distance from the lower end of the material flow guide plate 218 to the upper end of the circulating flow guide plate 241 is equal to the diameter of the inner circulating cylinder 240;

The radius of the lower end of the material flow guide plate 218 is 0.5-0.9 times of the radius of the inner circulating cylinder 240;

The height of the material flow guide plate 218 is 0.7-1.4 times of the radius of the upper end of the material flow guide plate 218.

In addition, the corresponding components and parameters of the material circulation section 212 and the discharging section 213 may be set to retain the material in the material circulation section 212 and the discharging section 213 for a required duration; preferably, the insoluble sulfur production system is configured in at least one of the following forms:

The diameter of the inner circulating cylinder 240 is 0.4-0.8 times of the diameter of the housing 210;

The distance from the lower end of the inner circulating cylinder 240 to the filter screen 260 is 0.1-0.5 meters;

The height of the inner circulating cylinder 240 is 2-6 times of the diameter of the inner circulating cylinder 240;

The distance from the filter screen 260 to the bottom enclosure of the housing 210 is 0.5-1 meters;

The filter screen 260 is in the same shape as the bottom enclosure of the housing 210.

In the present invention, the solvent inlet 214 and the quenching agent inlet 215 may be arranged at appropriate positions of the housing 210, and may be connected to corresponding external storage devices through corresponding pipelines. Preferably, the solvent inlet 214 and the quenching agent inlet 215 may be arranged in the side wall of the feed quenching section 211, so as to avoid interference with the operation of other sections (e.g., the material separation section 216).

In the present invention, the granulation device 220 may be in any appropriate form, as long as the material entrying from the feed port can be formed into granular material. The material fed from the feed port is usually in a liquid state in which the material is drawn and difficult to granulate; the granulation device 220 may be arranged to separate and granulate the material into a droplet-shaped granular material (also referred to as droplet material).

Figure 3:
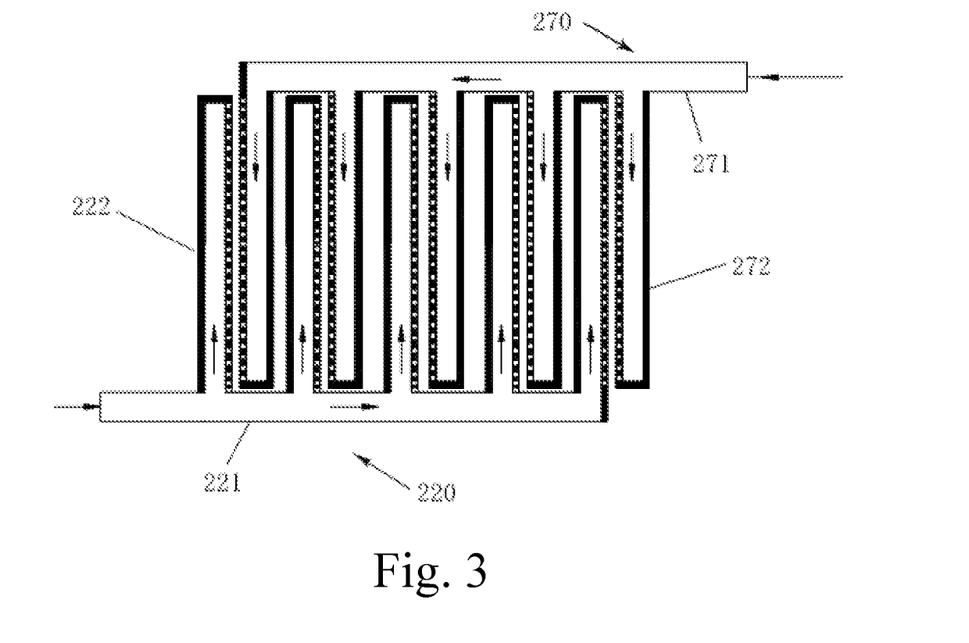
FIG. 3 is a top view of the granulation device and quenchant distributor in an embodiment of the present invention.
Figure 4:
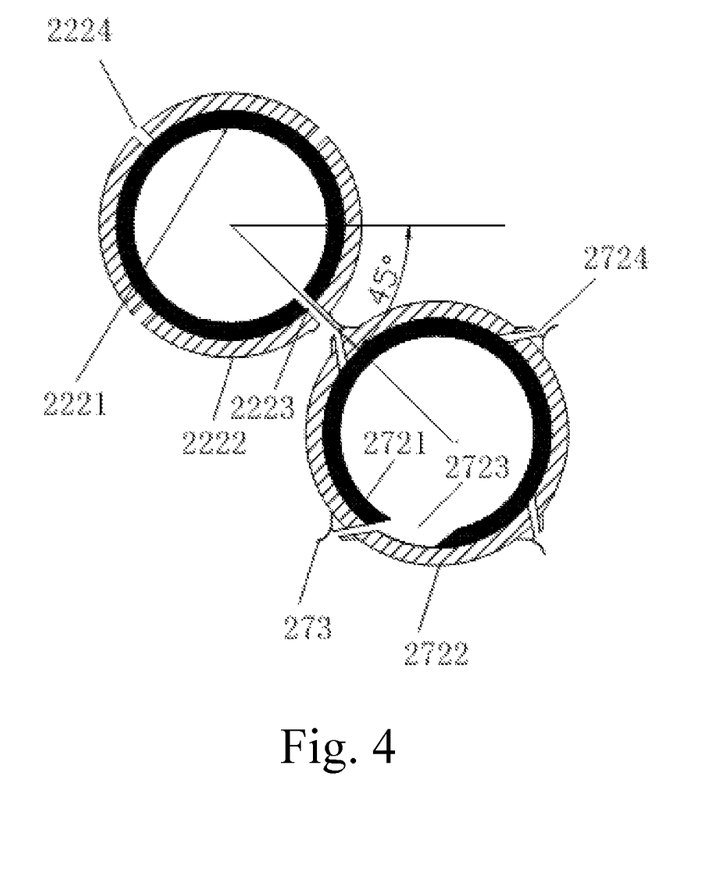
FIG. 4 is a sectional view of a corresponding pair of first distribution pipe and second distribution pipe in FIG. 3.

According to a preferred embodiment of the present invention, as shown in FIGS. 3 and 4, the granulation device 220 comprises a first feed pipe 221 in communication with the feed port and a first distribution pipe 222 in communication with the first feed pipe 221, the first distribution pipe 222 comprises a first fixed pipe 2221 and a first rotary pipe 2222 that is sleeved on the first fixed pipe 2221 and can rotate with respect to the first fixed pipe 2221, the pipe wall of the first fixed pipe 2221 is provided with a first discharge channel 2223 extending in the axial direction, the pipe wall of the first rotary pipe 2222 is provided with multiple groups of first discharge holes 2224 that can correspond to the first discharge channel 2223, each group of first discharge holes 2224 are arranged in the axial direction, and the multiple groups of first discharge holes 2224 are distributed in the circumferential direction of the first rotary pipe 2222.

In use, the material fed from the feed port flows through the first feed pipe 221 into the first fixed pipe 2221, and is rotated upward through the first rotary pipe 2222 to the first discharge holes 2224 aligned to the first discharge channel 2223 and then discharged. The first rotary pipe 2222 is rotated with respect to the first fixed pipe 2221, so as to discharge the material intermittently through different first discharge holes 2224; thus the material can be cut by means of the counter-rotation to form a droplet material corresponding to the shape of the first discharge holes 2224 and realize granulation. In order to obtain a droplet material in an appropriate size, the shape and parameters of the first discharge holes 2224 may be arranged appropriately; preferably, the first discharge holes 2224 may be in size of 0.5-3 mm, and the spacing between adjacent first discharge holes 2224 in the same group may be 3-15 mm. The size of the first discharge holes 2224 refers to the maximum dimension of the shape contour, and may vary depending on the shape of the first discharge holes 2224. For example, in the case of circular first discharge holes 2224, the size is the diameter; for elliptical first discharge holes 2224, the size is the major diameter of the ellipse; for rectangular first discharge holes 2224, the size is the length of the longer side.

In addition, in order to enable the quenchant to contact with the material extensively in the feed quenching section 211, a distributor for uniformly distributing the quenchant may be arranged in the feed quenching section 211. In a preferred embodiment of the present invention, as shown in FIGS. 3 and 4, the feed quenching section 221 is provided with a quenchant distributor 270, which comprises a second feed pipe 271 in communication with the quenching agent inlet 215 and a second distribution pipe 272 in communication with the second feed pipe 271, wherein the second distribution pipe 272 is arranged in parallel to the first distribution pipe 222, the setting height of the second distribution pipe 272 is lower than the first distribution pipe 222, and the second distribution pipe 272 comprises a second fixed pipe 2721 and a second rotary pipe 2722 that is sleeved on the second fixed pipe 2721 and can rotate with respect to the second fixed pipe 2721, the pipe wall of the second fixed pipe 2721 is provided with a second discharge channel 2723 extending in the axial direction, the pipe wall of the second rotary pipe 2722 is provided with multiple second discharge holes 2724 that can correspond to the second discharge channel 2723 and are distributed in the circumferential direction of the second rotary pipe 2722, the outer wall of the second rotary pipe 2722 is provided with a doctor blade 273 that can come into contact with the outer wall of the first rotary pipe 2222, the first discharge channel 2223 is arranged toward the second distribution pipe 272, and the second discharge channel 2723 is arranged offset from the first distribution pipe 222.

In use, the quenchant flows through the second feed pipe 271 into the second fixed pipe 2721, and is rotated upward by the second rotary pipe 2722 to the second discharge holes 2724 aligned to the second discharge channel 2723 and then discharged.

Since the quenchant is supplied to the quenching agent inlet 215 at certain pressure, it will be discharged from the second discharge holes 2724 in the form of jetting. In order to provide the quenchant uniformly along the second distribution pipe 272, each second discharge hole 2724 comprises a plurality of slits extending in the axial direction sequentially, and each slit is in 5-20 mm width; and/or the second discharge holes 2724 are configured to provide the quenchant in the tangential direction of the second rotary pipe 2722.

By arranging the second discharge channel 2723 offset from the first distribution pipe 222 (i.e., the second discharge channel 2723 is not between the first rotary pipe 2222 and the second rotary pipe 2722), the jetted quenchant will not contact immediately with the droplet material discharged from the first discharge holes 2224 and cause clogging of the first discharge holes 2224 by the droplets chilled suddenly. By orienting the first discharge channel 2223 toward the second distribution pipe 272 (i.e., the first discharge channel 2223 is located between the first rotary pipe 2222 and the second rotary pipe 2722, preferably the first discharge channel 2223 is located in a connecting line between the centers of circles of the first rotary pipe 2222 and the second rotary pipe 2722 on the same cross section), when the second rotary pipe 2722 is rotated, it can come into contact with the outer wall of the first rotary pipe 2222 through the doctor blade 273, thereby on one hand the drawn material can be cut into a droplet shape thoroughly to facilitate granulation, and on the other hand the material on the outer ends of the first discharge holes 2224 can be scraped off, so as to prevent the drawn material from adhering to the first discharge holes 2224 and prevent clogging of the first discharge holes 2224 incurred by the chilling of the material exposed to a low-temperature environment, thereby solve the problem that it is difficult to granulate the high-viscosity drawn material. More specifically, as shown in FIG. 4, the first discharge channel 2223 is open obliquely downward toward the second distribution pipe 272, and the second discharge channel 2723 is open obliquely downward toward the side where the first distribution pipe 222 is located.

The doctor blade 273 is preferably arranged to pass by the outer ends of the first discharge holes 2224 in a tangential manner. To attain that effect and avoid hard collision between the doctor blade 273 and the first rotary pipe 2222 during the relative movement of the doctor blade 273 and the first rotary pipe 2222, the doctor blade 273 is an elastic doctor blade. In that case, the doctor blade 273 may be dimensioned so that it extends beyond the minimum clearance between the first rotary pipe 2222 and the second rotary pipe 2722, thereby the doctor blade 273 is deformed elastically to have a portion essentially in the tangential direction of the first rotary pipe 2222 when the doctor blade 273 comes into contact with the first rotary pipe 2222, thereby the material is scraped off by that portion. In addition, the doctor blade may be made of a material to which the sulfur material can't adhere easily, in order to avoid adherence of the sulfur material to the doctor blade. Preferably, the doctor blade 273 is a stainless steel blade to make the requirements for elasticity and non-adherence.

In the present invention, the cooling of the droplet material discharged from the first discharge holes 2224 starts from the moment the droplet material leaves the first discharge holes 2224 to form into hot sulfur granules that have a solid outer layer and a liquid inner core; then the droplets contact with the quenchant extensively in the falling process in the quenching tower, and finally fall into the inner circulating cylinder 240 and are immersed in the quenchant and cooled into solid granules. Preferably, in order to distribute the granular material and the quenchant uniformly, as shown in FIG. 3, the first distribution pipe 222 and the second distribution pipe 272 are a plurality of distribution pipes that are arranged corresponding to each other alternatively, the plurality of first distribution pipes 222 are arranged side by side, the plurality of second distribution pipes 272 are arranged side by side, and a connecting line between the centers of cross sections of a first distribution pipe 222 and a corresponding second distribution pipe 272 in the same plane is at 40-50° with respect to the plane of arrangement of the first distribution pipes 222. The first distribution pipe 222 and the second distribution pipe 272 may be rake-formed distribution pipes and arranged in the transverse direction of the feed quenching section 211, so as to distribute the material and the quenchant uniformly on the entire cross section of the feed quenching section 211.

By arranging the first distribution pipe 222 and the second distribution pipe 272 in parallel to each other, the rotation axis of the first rotary pipe 2222 is parallel to that of the second rotary pipe 2722, so that the first rotary pipe 2222 and the second rotary pipe 2722 can be rotated by the same driving device. Specifically, the first rotary pipe 2222 and the second rotary pipe 2722 may be connected to the driving device via a transmission device respectively. In addition, the first rotary pipe 2222 and the second rotary pipe 2722 preferably rotate in the same direction, so as to improve the scraping effect of the doctor blade 273.

In addition, as shown in FIG. 1, the insoluble sulfur production system may comprise a washing filter 500 and a dryer 600, and the inlet and outlet of the washing filter 500 are in communication with the second discharge port and the dryer 600 respectively. Specifically, the washing filter 500 and the second discharge port may be connected through a pipeline between them, and transportation pressure may be provided in the pipeline by means of the discharge pump 700. The slurry material discharged from the discharge port may be conveniently sent to the washing filter 500 by the discharge pump 700 for further washing, extraction and filtration treatment, and the washing and filtering solvent may be recycled through a separate pipeline. The washing and filtration temperature is 65-95° C., and the washing and filtration operation is carried out continuously for 2-4 times. The insoluble sulfur obtained through filtration enters the dryer 600, for vacuum drying at 65-95° C. drying temperature for 1-5 hours at 100-1,000 Pa drying vacuum degree, thus an insoluble sulfur product is obtained after the drying. In a preferred embodiment of the present application, the granulation device 220, circulating pump 280, shear pump 230, inner circulating cylinder 240 and liquid distributor 250 etc. can realize uniform distribution of the temperature field during material quenching, as well as integrated operation of curing extraction and crushing extraction.

In another aspect, the present invention provides an insoluble sulfur production method, which comprises:

S1. raising the temperature of liquid sulfur in the present of an initiator under nitrogen shielding to perform polymerization reaction;

S2. introducing the polymerized material into a quenching tower and carrying out granulation and quenching treatment sequentially;

S3. carrying out solvent curing and extraction integrated treatment on the quenched product in the quenching tower;

S4. carrying out liquid-phase circulated crushing and extraction integrated treatment on the cured and extracted product in the quenching tower.

After material feeding, the insoluble sulfur production method provided by the present invention can accomplish granulation, quenching, curing extraction, and crushing extraction sequentially in the quenching tower and output a slurry material. By granulation after the feeding, it can ensure that the material is in a granular state in the follow-up quenching, curing and extraction process, so that the material contacts with the solvent and the quenchant extensively and can form a circulating flow along with the liquid; a slurry material can be obtained by liquid-phase circulated crushing, so as to avoid clogging in the transportation pipeline during subsequent transportation; the granulation device, circulating pump, shear pump, inner circulating cylinder and liquid distributor etc. can realize uniform distribution of the temperature field during material quenching, as well as integrated operation of curing extraction and crushing extraction.

The liquid-phase circulated crushing may be carried out in an appropriate way, for example, by using a shear pump. The slurry material may be filtered when it is outputted.

Preferably, the method comprises: S5. outputting the slurry obtained through liquid-phase circulated crushing from the quenching tower for washing filtration; S6. drying the solid product obtained through washing filtration to obtain an insoluble sulfur product. The slurry material discharged from the quenching tower may be conveniently sent to, for example, the washing filter 500 for further washing, extraction and filtration treatment, and the washing and filtering solvent may be recycled through a separate pipeline. The washing and filtration temperature is 65-95° C., and the washing and filtration operation is carried out continuously for 2-4 times. The insoluble sulfur obtained through filtration enters, for example, a dryer 600, for vacuum drying at 65-95° C. drying temperature for 1-5 hours at 100-1,000 Pa drying vacuum degree, thus an insoluble sulfur product is obtained after the drying.

In the insoluble sulfur production method in the present invention, the polymerization temperature may be 200-270° C., preferably 250-260° C.; and the polymerization duration may be 30-60 minutes, preferably 30-45 minutes.

In the insoluble sulfur production method in the present invention, the initiator may be one or more of potassium persulfate, dimethyl sulfoxide, etc. The feed amount of the initiator is 0.05 wt %-0.3 wt %, preferably 0.1 wt %-0.2 wt % of the feed amount of the liquid sulfur.

In the insoluble sulfur production method in the present invention, the quenching temperature may be 50-70° C., preferably 55-65° C.; and the quenching duration may be 5-30 minutes, preferably 10-20 minutes.

In the insoluble sulfur production method in the present invention, the quenchant may be soft water. In the insoluble sulfur production method in the present invention, the solvent used in the curing, washing and filtering process may be one or more of cyclohexane, benzene, paraxylene, etc., preferably is paraxylene.

In the insoluble sulfur production method in the present invention, the curing temperature may be 55-75° C., preferably 60-65° C.; the curing duration may be 3-10 hours, preferably 5-9 hours. The extraction agent may be used as the curing solvent, so as to carry out sulfur granule curing and extraction at the same time; thus, compared with the conventional low-temperature melting method, the curing time is shortened, a quenchant drying process can be avoided, the technical process is greatly shortened, the process flow is simplified, and the production efficiency is improved.

In the insoluble sulfur production method provided by the present invention, the processing temperature of the liquid-phase circulated crushing may be 45-75° C., preferably 50-60° C., the processing time may be 30-60 minutes, preferably 35-50 minutes, and the granularity of the granules after the crushing may be 100-250 mpi, preferably 120-200 mpi. The extraction agent may be used as the solvent for the liquid-phase circulated crushing, and sulfur granule crushing and extraction are carried out at the same time; compared with the conventional dry mechanical crushing method, the adverse effect of increased material temperature on the product quality during the crushing can be avoided.

In the insoluble sulfur production method provided by the present invention, the temperature of washing filtration may be 65-95° C., preferably 70-85° C., and the washing filtration is carried out continuously for 2-4 times, preferably 2-3 times.

In the insoluble sulfur production method provided by the present invention, the drying may be vacuum drying, the drying temperature may be 65-95° C., preferably 70-85° C., the drying duration may be 1-5 hours, preferably 35-50 minutes, and the vacuum degree of drying may be 100-1,000 Pa, preferably 200-500 Pa.

Preferably, the method in the present invention may be implemented with the insoluble sulfur production system provided by the present invention.

While the present invention is described above in detail in some preferred embodiments with reference to the accompanying drawings, the present invention is not limited to those embodiments. Various simple variations may be made to the technical scheme of the present invention within the technical concept of the present invention. The specific technical features included in the present invention may be combined in any appropriate way. To avoid unnecessary repetition, the possible combinations are not described specifically in the present invention. However, such simple variations and combinations shall also be deemed as having been disclosed and falling in the scope of protection of the present invention.

The invention claimed is:

1. An insoluble sulfur production system, comprising a cooler (300) and a kettle (100) having a first discharge port and a quenching tower (200) having a feed port, wherein the first discharge port is in communication with the feed port, and the quenching tower (200) comprises a housing (210) that is cylindrical in shape, a granulation device (220) and a shear pump (230), the housing (210) has a feed quenching section (211) and a discharging section (213) that are arranged from top to bottom, and a side wall of the housing (210) is provided with a solvent inlet (214) for providing a solvent and a quenching agent inlet (215) for providing a quenchant, wherein:

the feed port is arranged on the feed quenching section (211), and the granulation device (220) is disposed in the feed quenching section (211);

the discharging section (213) is provided with a second discharge port and a filter screen (260) above the second discharge port, and a side wall of the discharging section (213) above the filter screen (260) is provided with a circulating outlet and a circulating inlet in communication with an inlet and an outlet of the shear pump (230), respectively, and the housing (210) comprises a material separation section (216) for solid-liquid separation and a material circulation section (212) for circulating the materials between the feed quenching section (211) and the discharging section (213), an inner cylinder (240) and a device (250) for spraying a quenchant or solvent into the inner cylinder (240) are arranged in the material circulating section (212), and a circulating liquid outlet (217) for discharging the separated liquid is arranged in the side wall of a material separating section (216), the liquid discharged from the circulating liquid outlet (217) is cooled by the cooler (300) and sent by the circulating pump (280) to the circulating inlet, the circulating inlet is in communication with the device (250).

2. The insoluble sulfur production system according to claim 1, wherein a conical cylinder-shaped circulating flow guide plate (241) expanding downward gradually is arranged on the periphery at the top of the inner cylinder (240), with clearance between the circulating flow guide plate (241) and the inner wall of the housing (210); preferably, the radius of the lower end of the circulating flow guide plate (241) is 0.5-0.9 times of the radius of the housing (210).

3. The insoluble sulfur production system according to claim 2, wherein the inner wall of the material separation section (216) is provided with a conical cylinder-shaped material flow guide plate (218) tapered toward the inner cylinder (240), and the material flow guide plate (218) is above the circulating liquid outlet (217); preferably, the material flow guide plate (218) is configured in at least one of the following forms:

a. the distance from the lower end of the material flow guide plate (218) to the upper end of the circulating flow guide plate (241) is equal to the diameter of the inner cylinder (240);

b. the radius of the lower end of the material flow guide plate (218) is 0.5-0.9 times of the radius of the inner cylinder (240);

c. the height of the material flow guide plate (218) is 0.7-1.4 times of the radius of the upper end of the material flow guide plate (218).

4. The insoluble sulfur production system according to claim 2, the insoluble sulfur production system configured in at least one of the following forms:

a. the diameter of the inner cylinder (240) is 0.4-0.8 times of the diameter of the housing (210);

b. the distance from the lower end of the inner cylinder (240) to the filter screen (260) is 0.1-0.5 meters;

c. the height of the inner cylinder (240) is 2-6 times of the diameter of the inner cylinder (240);

d. the distance from the filter screen (260) to the bottom enclosure of the housing (210) is 0.5-1 meters;

e. the filter screen (260) is in the same shape as the bottom enclosure of the housing (210).

5. The insoluble sulfur production system according to claim 1, wherein the solvent inlet (214) and the quenching agent inlet (215) are arranged in the side wall of the feed quenching section (211).

6. The insoluble sulfur production system according to claim 1, wherein the granulation device (220) comprises a first feed pipe (221) in communication with the feed port and a first distribution pipe (222) in communication with the first feed pipe (221), the first distribution pipe (222) comprises a first fixed pipe (2221) and a first rotary pipe (2222) that is sleeved on the first fixed pipe (2221) and can rotate with respect to the first fixed pipe (2221), the pipe wall of the first fixed pipe (2221) is provided with a first discharge channel (2223) extending in the axial direction, the pipe wall of the first rotary pipe (2222) is provided with multiple groups of first discharge holes (2224) that can correspond to the first discharge channel (2223), each group of first discharge holes (2224) are arranged in the axial direction, and the multiple groups of first discharge holes (2224) are distributed in the circumferential direction of the first rotary pipe (2222).

7. The insoluble sulfur production system according to claim 6, wherein the feed quenching section (221211) is provided with a quenchant distributor (270), which comprises a second feed pipe (271) in communication with the quenching agent inlet (215) and a second distribution pipe (272) in communication with the second feed pipe (271), wherein the second distribution pipe (272) is arranged in parallel to the first distribution pipe (222), the setting height of the second distribution pipe (272) is lower than the first distribution pipe (222), and the second distribution pipe (272) comprises a second fixed pipe (2721) and a second rotary pipe (2722) that is sleeved on the second fixed pipe (2721) and can rotate with respect to the second fixed pipe (2721), the pipe wall of the second fixed pipe (2721) is provided with a second discharge channel (2723) extending in the axial direction, the pipe wall of the second rotary pipe (2722) is provided with multiple second discharge holes (2724) that can correspond to the second discharge channel (2723) and are distributed in the circumferential direction of the second rotary pipe (2722), the outer wall of the second rotary pipe (2722) is provided with a doctor blade (273) that can come into contact with the outer wall of the first rotary pipe (2222), the first discharge channel (2223) is arranged toward the second distribution pipe (272), and the second discharge channel (2723) is arranged offset from the first distribution pipe (222).

8. The insoluble sulfur production system according to claim 7, wherein the doctor blade (273) is a stainless steel blade, and/or the first distribution pipe (222) and the second distribution pipe (272) are a plurality of distribution pipes that are arranged corresponding to each other alternatively, the plurality of first distribution pipes (222) are arranged side by side, the plurality of second distribution pipes (272) are arranged side by side, and a connecting line between the centers of cross sections of a first distribution pipe (222) and a corresponding second distribution pipe (272) in the same plane is at 40-50° with respect to the plane of arrangement of the first distribution pipes (222).

9. The insoluble sulfur production system according to claim 7, wherein:
the first discharge holes (2224) are in diameter of 0.5-3 mm, and the spacing between adjacent first discharge holes (2224) in the same group is 3-15 mm;
and/or each second discharge hole (2724) comprises a plurality of slits that extend in the axial direction sequentially and are in width of 5-20 mm respectively, and/or the second discharge holes (2724) are arranged to provide the quenchant in the tangential direction of the second rotary pipe (2722).

10. The insoluble sulfur production system according to claim 7, wherein the first rotary pipe (2222) and the second rotary pipe (2722) are connected to a driving device via a transmission device respectively; and/or the first rotary pipe (2222) and the second rotary pipe (2722) rotate in the same direction.

11. The insoluble sulfur production system according to claim 1, comprising a washing filter (500) and a dryer (600), wherein the inlet and outlet of the washing filter (500) are in communication with the second discharge port and the dryer (600) respectively.

12. A method for producing insoluble sulfur through a low-temperature melting process, comprising:
S1. raising the temperature of liquid sulfur in the present of an initiator and under nitrogen shielding to perform polymerization reaction;
S2. introducing the polymerized material into a quenching tower and carrying out granulation and quenching treatment sequentially;
S3. carrying out solvent curing and extraction on the quenched product in the quenching tower;
S4. carrying out liquid-phase circulated crushing and extraction treatment on the cured and extracted product in the quenching tower,
wherein the insoluble sulfur production system comprises a cooler (300) and a kettle (100) having a first discharge port and a quenching tower (200) having a feed port, wherein the first discharge port is in communication with the feed port, and the quenching tower (200) comprises a housing (210) that is cylindrical in shape, a granulation device (220) and a shear pump (230), the housing (210) has a feed quenching section (211) and a discharging section (213) that are arranged from top to bottom, and a side wall of the housing (210) is provided with a solvent inlet (214) for providing a solvent and a quenching agent inlet (215) for providing a quenchant, wherein:
the feed port is arranged on the feed quenching section (211), and the granulation device (220) is disposed in the feed quenching section (211);
the discharging section (213) is provided with a second discharge port and a filter screen (260) above the second discharge port, and a side wall of the discharging section (213) above the filter screen (260) is provided with a circulating outlet and a circulating inlet in communication with an inlet and an outlet of the shear pump (230), respectively, and
the housing (210) comprises a material separation section (216) for solid-liquid separation and a material circulation section (212) for circulating the materials between the feed quenching section (211) and the discharging section (213), an inner cylinder (240) and a device (250) for spraying a quenchant or solvent into the inner cylinder (240) are arranged in the material circulating section (212), and a circulating liquid outlet (217) for discharging the separated liquid is arranged in the side wall of a material separating section (216), the liquid discharged from the circulating liquid outlet (217) is cooled by the cooler (300) and sent by the circulating pump (280) to the circulating inlet, the circulating inlet is in communication with the device (250).

13. The method for producing insoluble sulfur through a low-temperature melting process according to claim 12, further comprising:
S5. outputting the slurry obtained through liquid-phase circulated crushing from the quenching tower for washing filtration; and S6. drying the solid product obtained through washing filtration to obtain an insoluble sulfur product.

14. The method for producing insoluble sulfur through a low-temperature melting process according to claim 12, wherein the material is granulated to 0.5-3 mm size in the S1; and/or the cured product is crushed to granules in size of 0.15 mm or lower in the S4.

* * * * *